United States Patent
Walgers et al.

(10) Patent No.: US 6,298,302 B2
(45) Date of Patent: *Oct. 2, 2001

(54) NAVIGATION SYSTEM FOR PROVIDING AN OPTIMAL ROUTE FROM TRAFFIC MESSAGES

(75) Inventors: Erik J. Walgers; Carla J. M. Emmerink; Paul D. M. Lahaije; Edwin W. Mulder, all of Eindhoven (NL)

(73) Assignee: Mannesman VDO, Frankfurt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,530

(22) Filed: Jun. 30, 1998

(30) Foreign Application Priority Data

Jul. 1, 1997 (EP) ................................. 97202003

(51) Int. Cl.$^7$ .............................. G01C 21/28; G08G 1/09
(52) U.S. Cl. ..................... 701/209; 701/210; 340/905; 455/186.1
(58) Field of Search .................................. 701/201, 207, 701/208, 209, 210, 211; 340/902, 904, 905; 705/6, 41; 707/4; 379/113, 133; 455/457, 186.1, 345

(56) References Cited

U.S. PATENT DOCUMENTS

| | | | |
|---|---|---|---|
| 4,907,159 | * | 3/1990 | Mauge et al. ........................ 701/117 |
| 5,193,214 | * | 3/1993 | Mardus et al. ...................... 455/54.2 |
| 5,428,544 | * | 6/1995 | Shyu ..................................... 701/200 |
| 5,428,545 | * | 6/1995 | Maegawa et al. .................... 701/200 |
| 5,465,088 | * | 11/1995 | Braegas ................................ 340/905 |
| 5,568,390 | * | 10/1996 | Hirota et al. ......................... 701/207 |
| 5,610,821 | * | 3/1997 | Gazis et al. .......................... 701/202 |
| 5,712,632 | * | 1/1998 | Nishimura et al. .................. 340/995 |
| 5,784,691 | * | 7/1998 | Riihl .................................. 455/186.1 |
| 5,850,193 | * | 12/1998 | Shimoura et al. .................. 340/995 |
| 5,862,510 | * | 1/1999 | Saga et al. ........................... 701/211 |
| 5,892,463 | * | 4/1999 | Hikita et al. ......................... 340/995 |
| 5,908,464 | * | 6/1999 | Kishigami et al. .................. 701/208 |
| 5,928,305 | * | 7/1999 | Nomura ............................... 701/207 |
| 5,933,094 | * | 8/1999 | Goss et al. ........................... 340/905 |
| 5,987,382 | * | 11/1999 | Weishaupt et al. .................. 701/211 |
| 6,018,697 | * | 1/2000 | Morimoto et al. .................. 701/209 |
| 6,173,165 | * | 1/2001 | Ruhl .................................. 455/186.1 |

OTHER PUBLICATIONS

Traffic messaging, dynamic updating and road database standards: the major issues, S. Queree and T. Wood, IEE Colloquium on Prometheus and Drive (Digest No. 172), pp. 9 1–3, Oct. 15, 1992.

European Conference on Ministers of Transport (ECMT) and laid down in the pre–standard prENV/278/4/1/0010, (month and year are not available).

* cited by examiner

*Primary Examiner*—Tan Nguyen
(74) *Attorney, Agent, or Firm*—Mayer Brown & Platt

(57) ABSTRACT

A vehicle navigation system (100) comprises a planning module (110) for planning a route between an origin and a destination and subsequently guides the driver along the planned route. The system further comprises a receiver (124) for the reception of traffic messages related to problem locations on roads, which messages are transferred to the driver. The navigation system according to the invention is arranged to read from its storage medium (106) with the map database additional information (404) indicating the potential problem locations for roads in the database. In this way, the information from the traffic message can be combined with the information from the map database and further exploited in the system, e.g. for planning a new route.

13 Claims, 4 Drawing Sheets

NAVIGATION SYSTEM FOR PROVIDING AN OPTIMAL ROUTE FROM TRAFFIC MESSAGES

BACKGROUND OF THE INVENTION

1. Field of the Invention

The invention relates to a navigation system for guiding a driver in a vehicle, the system comprising read means for reading chain information from a storage medium comprising a first storage unit with chains and nodes, a chain representing a road element and being connected to another chain via a node, process means for exploiting said chain information, for example a planning module for planning a route or a display module for displaying a map on a display, and a receiver for the reception of a traffic message related to a pre-defined problem location.

The invention further relates to a storage medium for use in a navigation system, the storage medium comprising a first storage unit with chains and nodes, a chain representing a road element and being connected to another chain via a node.

2. Description of Related Art

Such a system is described in the article "Traffic messaging, dynamic updating and road database standards the major issues", S. Querée and T. Wood, IEE Colloquium on 'Prometheus and Drive' (Digest No. 172), pp. 9/1–3, Oct. 15, 1992. This computer assisted driver information system comprises a digital map representing the roads and junctions on which the driver can travel. The digital map resides on some storage medium that can be read by the navigation system. Based on the information in the map, the navigation system guides the driver during his journey. The digital map on the storage medium is static in that it reflects the information of roads at the moment the data for the storage medium is manufactured. Later changes to the roads after the storage medium has been manufactured are not present. The known system includes a receiver for the reception of traffic messages that are broadcast according to the Radio Data System (RDS). In RDS, the message is broadcast together with the audio signals of a radio program and the RDS receiver in the vehicle can receive the combined signals and separate the message from the audio. Within RDS, the Traffic Message Channel (TMC) is a set of coded traffic messages, agreed by the European Conference of Ministers of Transport (ECMT) and laid down in the pre-standard prENV/278/4/1/0010. The traffic message according to TMC provides, among others, an event and a location. An event relates to a happening or circumstance of importance to a driver, like a temporary road closure, slow traffic on a road or fog. A large number of events have been standardised and the message contains a code indicating such standardised event. The location in the traffic message indicates the area, highway segment or point location where the source of the problem is situated. In a country, the respective authority has defined a number of potential problem locations in advance and has given these locations a unique number. The traffic message contains such problem location number to identify the problem location at hand.

After the receiver has received the traffic message, the system consults on the basis of the code and problem location number a local table to establish the event and the problem location of the traffic message. Subsequently the driver is informed through a spoken message and/or a written message. The traffic messages are typically intended directly for the driver and have been coded in isolation from the digital map of the navigation system. Therefore, the messages cannot be processed by the navigation system and cannot be used to update the static digital map on the storage medium, but are only supplied to the driver.

SUMMARY OF THE INVENTION

It is an object of the invention to provide a navigation system of the kind set forth which is able to exploit traffic messages related to problem locations in combination with the road information on the storage medium in an efficient way. This object is achieved according to the invention in a navigation system which is characterised in that the read means are arranged to read from the storage medium for a particular chain related to a particular node corresponding to a problem location additional chain information comprising an identification of that problem location. Using the additional chain information the system can easily establish to which problem location a chain in use by the system relates. If a traffic message is received, the system can then compare the problem location to which the message relates with the problem location to which the chain relates. If these are different problem locations, the system may discard the message else the system may further interpret the message in order to determine its consequences.

According to an embodiment of the navigation system according to the invention is when a traffic message is received, the system determines whether the identification of the problem location to which the traffic message relates is present in the list related to chains that are in the search area and thus have been considered when the route was planned. If the identification is not present, then the system may discard the traffic message since it relates to a problem location that has no effect on the planned route. If the identification is present, then this means that the traffic message is related to a problem location in the search area and the system may decide to plan a new route. Thanks to the list, the system can quickly determine whether a traffic message is relevant for the planned route without having to access all the chains of the search area.

According to another embodiment of the navigation system according to the invention when a traffic message is received, the system can through accessing the sub-list quickly determine whether the problem location of the traffic message is related to a problem location on the planned route. If this is the case, the system may decide to re-plan the route between the current vehicle position and the destination, taking into account the newly received information in the traffic message.

According to another embodiment of the navigation system according to the invention This allows the storage of the additional chain information on a separate place on the storage medium, independent from the first storage unit. This has the advantage that a version of a storage medium including the second storage unit is compatible with an earlier version of a storage medium with only the first storage unit, i.e. a system designed for reading the earlier version need not be adapted in order to be able to read the later version and vice versa.

The object of the invention is alternatively achieved according to the invention in a navigation system which is characterised in that the read means are arranged to read from the storage medium for the problem location related to the traffic message a first identification of a first one of the chains connected to a particular to the problem location by a corresponding node. By reading the identification of the chain connected to the problem location, the system is able to directly determine the relevant chain related to a received traffic message. When a traffic message is received, the system can directly act on the relevant chain or chains without accessing other chains to see if they are related to the message. An application is where the system has displayed a map of roads and subsequently receives a traffic message concerning a traffic queue at a certain problem location, whereby the road on which the traffic queue is present must be highlighted. Through the first identification, the system can directly locate the chain connected to the certain problem location and highlight it. Subsequently, the system can determine, based on the knowledge of the connection of chains and the specification given in the message, which further chains are affected and must be highlighted.

According to another embodiment of the navigation system according to the invention the pre-defined problem locations are specified in a certain order with respect to each other, whereby the order corresponds to a certain direction of travelling. So a problem location has a previous problem location and a next problem location. A category of traffic messages can relate to an event in one of two different directions with respect to the problem location. An example is a traffic message related to a traffic queue at a specific problem location the traffic queue may extend from that specific problem location in the direction of the previous problem location or from that specific problem location in the direction of the next problem location. Therefore, it is advantageous to specify for a problem location a chain in each direction of travelling so that for both directions the relevant chain can be directly identified.

It is a further object of the invention to provide a storage medium of the kind set forth which enables the exploitation of traffic messages related to problem locations in combination with the road information on the storage medium in an efficient way. This object is achieved according to the invention in a storage medium which is characterised in that the storage medium comprises for a particular chain a first identification of a first problem location, which first problem location corresponds to a particular node related to the particular chain. A system accessing the storage medium can establish the identification of the problem location corresponding to the node a given chain or chains of which have been used. When a traffic message is received concerning a specific problem location, the system can easily determine whether this specific problem location relates to the chain or chains used. The first identification provides an efficient mechanism to integrate the information on chains and nodes with the information received through traffic messages.

According to another embodiment of the navigation system according to the invention by storing the identification of the problem location in a second storage unit, separate from the first storage unit, the first storage unit is not influenced by this storing. This has the advantage that the storage medium with the stored identifications of problem locations is compatible with the storage medium without the identifications. In this way, a system designed for reading the version of the storage medium without the identifications need not be modified in order to be able to read the later version of the storage medium with the identifications of problem locations. Also a later version of the system can easily be designed in such a way that it can read both versions of the storage medium.

The further object of the invention is alternatively achieved according to the invention in a storage medium which is characterised in that the storage medium comprises for a particular pre-defined problem location a first identification of a first one of the chains, which chain is connected to the pre-defined problem location by a corresponding node. When a traffic message is received, the system accessing the storage medium can efficiently establish which of the chains is connected to the node which corresponds to the problem location in the traffic message. This chain can then be processed in accordance with the traffic message. For example, a system displaying a map can, after a traffic message has been received concerning a traffic queue at a problem location, indicate this on the displayed map starting at the respective chain.

BRIEF DESCRIPTION OF THE DRAWING

The invention and its attendant advantages will be further elucidated with the aid of exemplary embodiments and the accompanying schematic drawings, whereby:

FIG. 3 shows an example of identifications of chains for given problem locations.

Corresponding features in the various Figures are denoted by the same reference symbols.

DESCRIPTION OF THE PREFERRED EMBODIMENTS

Figure 1:
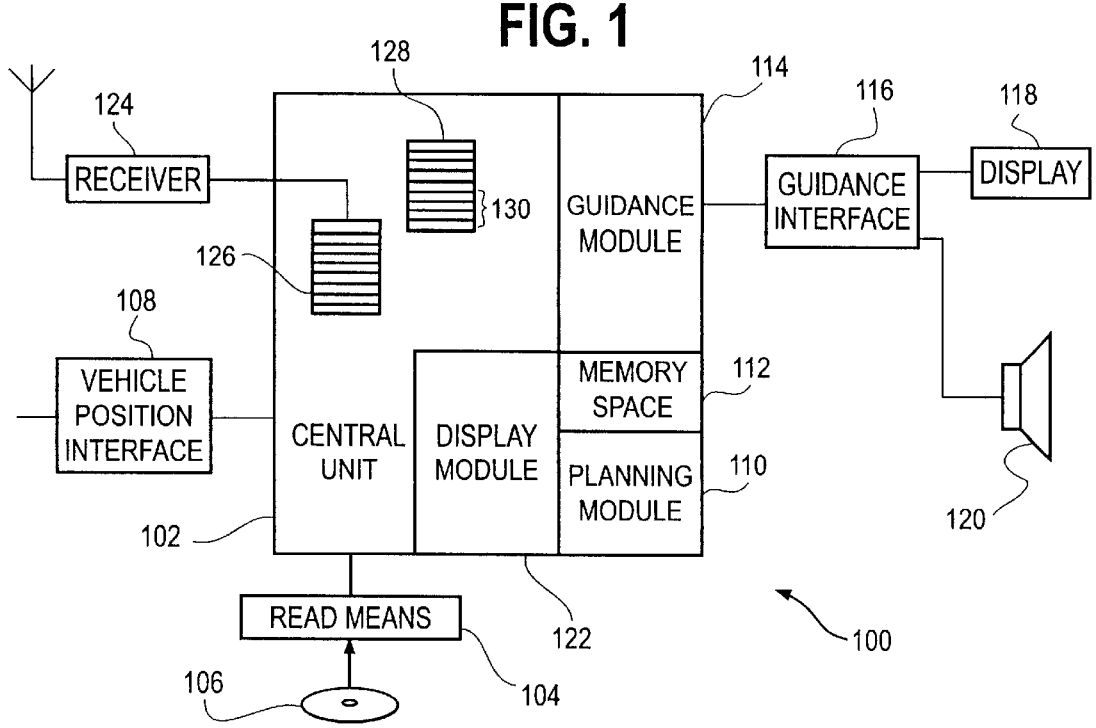
FIG. 1 schematically shows elements of a system according to the invention.

FIG. 1 schematically shows some of the elements of a system according to the invention. The system 100 comprises a central unit 102 which controls the operation of the system and which includes various modules for performing specific tasks. The central unit can be implemented on a computer comprising a central processor and working memory laded with software programs for carrying out the specific tasks. The system 100 has read mans 104 to read information from a map database stored on a data carrier, like CD-ROM 106. Other types of carrier can also be used, e.g. magnetic disk and IC Card. The map database comprises information on roads of the area to which the particular map relates, e.g. the roads of a country or of a state. In the map database, a chain is used to represent a road element identifying an elementary part of a road. Chains are used to represent the road in a discrete way. Examples of road elements are: a part of the road between two junctions, a part of the road with a certain direction, a part of the road with a certain name, and a part of the road at an intersection. Furthermore, the map database has nodes, representing the begin and end points of a road element. So a chain terminates at a node and a next chain starts at that node, thus forming a network of routes. A node may be a junction between roads, so more than two chains are connected to that node, or may be an intermediate point where two chains are connected. The system 100 is equipped with a vehicle position interface 108 suitable for receiving information concerning the current position of the vehicle in which the system is employed. This information can be supplied by a position determining system like a GPS receiver, using information broadcast by dedicated satellites. However, the position information can also be determined in another way, for instance using a locating system with one or more distance sensors, for measuring the distance travelled by the vehicle, and a compass, for measuring the heading of the vehicle. The system 100 further comprises a planning module 110 that is suitable to plan a route between an origin, e.g. the current position of the vehicle, and a desired destination. The desired destination is entered into the system in a convenient way, e.g. by entering the post code via a keyboard, by entering road names, by entering coordinates or by pointing to a position on a map displayed by the system. The planning module 110 searches through the map database for a route that is optimal according to some criterion. The planning module creates a large number of possible routes, each comprising a number of road elements, between the origin and the desired destination. The criterion can be the travel time, the travel distance, a combination of time and distance, or some other criterion that can be derived from information in the map database. The resulting route, comprising a number of selected chains, is stored in memory space 112 and the driver of the vehicle is given guidance to follow this route. To this end, the system comprises a guidance module 114 and an guidance interface 116 for sending the guidance information to display 118 and/or loudspeaker 120. Providing a driver with guidance to follow a predetermined route is known in the art and is for instance described in U.S. Pat. No. 5,537,323. The system 100 may further comprise a display module 122 to display the chains of a section of the map on display 118. This section is displayed in a suitable scale and may indicate the planned route, the current position of the vehicle and the destination.

The system 100 comprises a receiver 124 for the reception of traffic messages. The traffic message is interpreted by the system and information from the message, like the event and the problem location, may be stored in list 126. The planning module 110 may be arranged to search only a limited selection of the chains in the database when planning a route between the origin and the destination. A limitation of the number of chains to be taken into account results in a considerable saving of computational effort and time required to plan a route. The justification for the limitation is that roads far away from the origin and destination will probably never be part of the optimal route and can therefore be safely discarded by the planning module. The planning module then only searches for chains in the so-called search area, which is an area including the origin and the destination and which is formed on the basis of heuristic rules. As will be further explained below, the storage medium 106 may include an identification of a problem location to which a chain relates. Now, the system is arranged to create a list 128 for these identifications relating to the chains in the search area. Furthermore the system may be arranged to create a sub-list 130 of the identifications that relate to chains that are part of the planned route. When a traffic message is received relating to a particular problem location, the system can consult the list 128 to verify whether this particular problem location relates to a chain that is within the search area, i.e. has been considered by the planning module while creating the planned route. If the chain relating to the particular problem location is outside the search area, the message relates to an event that is not relevant for the planned route and may safely be discarded. If the chain relating to the particular problem location is inside the search area, the system must interpret the message and it may be necessary to re-plan a route to the destination now taking into account the circumstances indicated in the traffic message. The following situations can occur:

the chain of the problem location is in the search area, but not on the planned route, and the event indicates a worse travel condition for that chain re-planning is not necessary since the planned route will remain the optimal one;

the chain of the problem location is in the search area, but not on the planned route, and the event indicates an improved travel condition for that chain re-planning is necessary since a route including the chain could have become better than the planned route;

the chain of the problem location is in the search area and on the planned route, and the event indicates a worse travel condition for that chain re-planning is necessary since the planned route could no longer be the optimal one;

the chain of the problem location is in the search area and on the planned route, and the event indicates an improved travel condition for that chain re-planning is not necessary since the planned route has improved and will remain the optimal on.

Figure 2:
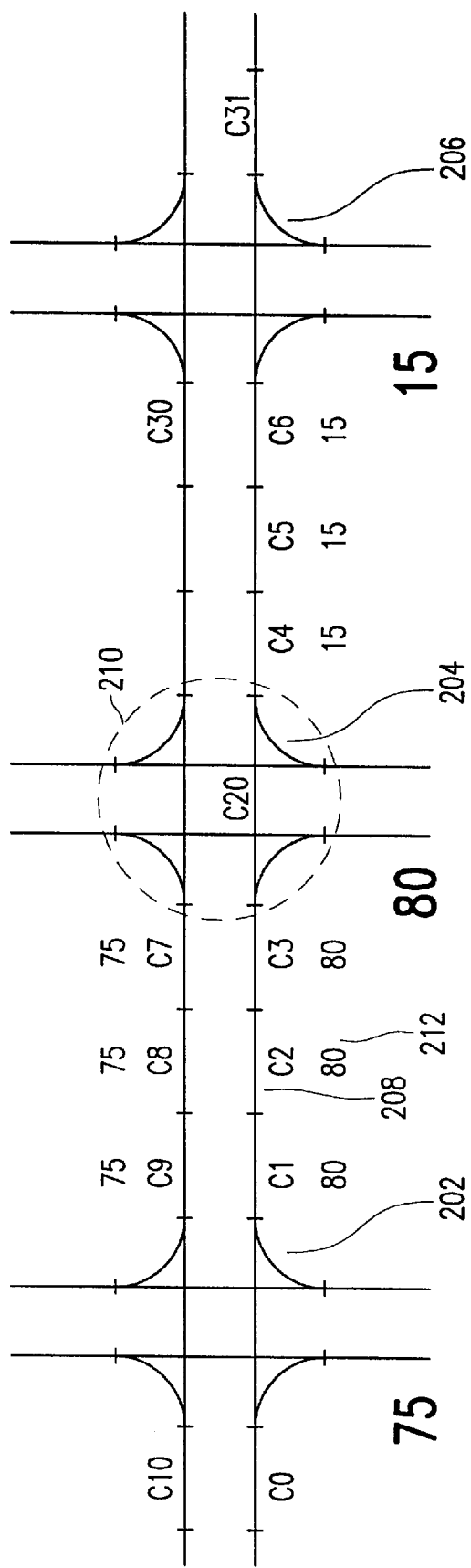
FIG. 2 shows an example of problem locations and interconnecting chains.

FIG. 2 shows an example of problem locations and interconnecting chains. An authority of a state or a country determines which locations on the roads for which it is responsible qualify as locations for which it must be possible to broadcast an event in a traffic message. These locations are called problem locations and are given a unique problem location number to identify them in the traffic message. Furthermore, the problem locations are ordered with respect to a pre-defined direction of travelling, by specifying for a problem location a previous problem location and a next problem location. The example shows a problem location 202, with problem location number 75, a problem location 204, with problem location number 80, and a problem location 206, with problem location number 15. Roads are represented in the database of the system by a series of chains, each having an identification, e.g. chain 208 has identification c2. In the example of FIG. 2, the roads between the problem locations have different lanes for the different directions of travelling and this is represented by a different series of chains for each direction. For instance the series c1- c2- c3 is used to travel from problem location 202 to problem location 204 and the series c7–c8–c9 is used to travel from problem location 204 to problem location 202. A problem location may indicate a certain relatively small region instead of a single point position. For instance a junction of highways may be in the form of a clover leaf with various exits and overpasses and still be identified as a single problem location. Then the chains of such a junction are considered as part of the problem location and not as road elements between problem locations. For instance, chain c20, are within the region 210 of problem location 204 and are considered internal chains of that problem location. The database of the system contains information about a chain, like its start and end node, its direction, its name and many more items. This information is exploited by the system in various ways, e.g. for route planning and for drawing a map on the display. Now, according to the invention the storage medium contains additional information for a chain indicating to what problem location this chain leads. In the example of FIG. 2, chain 208 leads to problem location 204 and this is represented by the additional chain information 212. Through this additional chain information, the information present in the database, which information is related to the chains, can be linked to the information received in the traffic messages, which information is related to problem location numbers.

FIG. 3 shows an example of identifications of chains for given problem locations. The storage medium comprises information on the pre-defined problem locations.

This can be in the form of a table 302, wherein a column represents a certain type of information about the problem location and a row corresponds to a record with the various fields of information for a given problem location. The example shows the following type of information:

- column 304, the problem location number,
- column 306, the problem location number of the previous problem location,
- column 308, the problem location number of the next problem location,
- column 310, the identification of the connected chain, extending from the problem location into the positive direction, and
- column 312, the identification of the connected chain, extending from the problem location into the negative direction.

Many more types of information can be stored for a problem location, but are not of relevance for the present invention. The rows for which data is shown in the fields correspond to the problem locations of FIG. 2 row 314 corresponds to problem location 206, row 316 to problem location 202, and row 318 to problem location 204. The identification of the chains, available in the database of the system, for given problem location numbers, available from received traffic messages, provide a means for combining the information from the database with the information from the traffic messages. This information is stored on the storage medium but outside the database of the chains, so as to leave the structure of the database unchanged. When a traffic message with a given problem location is received, the system is able to directly determine which chains are connected to that problem location and may be affected by the event of the traffic message.

Figure 4:
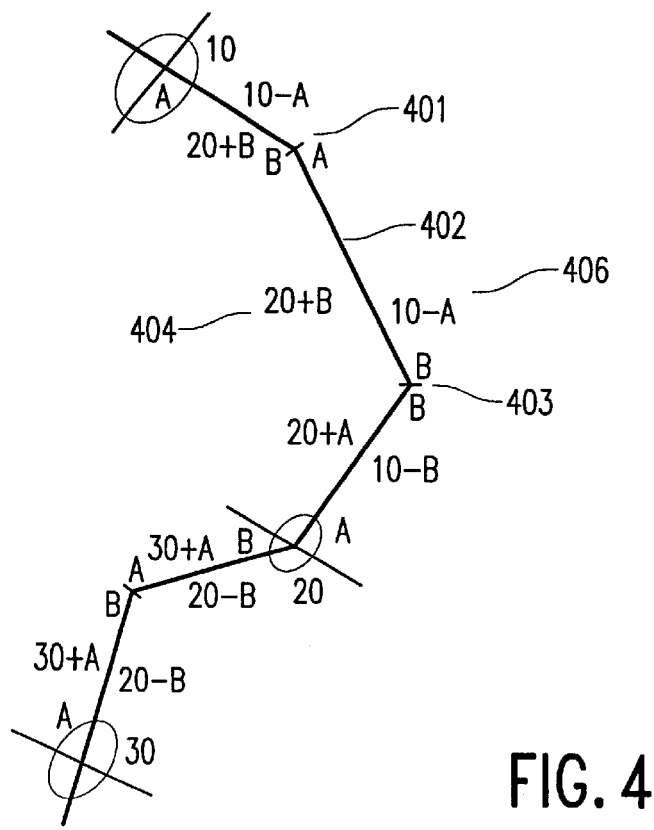
FIG. 4 shows an example of additional chain information for 2-directional chains.

FIG. 4 shows an example of additional chain information for 2-directional chains. A chain in the database has a node A and a node B, wherein by definition the x-co-ordinate of the node A is the smallest of the two nodes. An example is chain 402 with node 401 as its node A and with node 403 as its node B. In this embodiment of the invention, the additional chain information comprises three items the number of the problem location to which the chain leads, an indication whether the direction to reach that problem location is positive or negative, and the node in the direction of the referred problem 30 location. For example chain 402, has additional chain information 404 comprising '20+B'. This means that chain 402 leads towards problem location number 20, which is in the direction defined as positive and that this is in the direction of the node B of the chain. Since chain 402 can be travelled in two directions, there is another additional information item 406 for this chain comprising '10-A'. This means that chain 402 leads, if travelled in the reverse direction, to problem location 10, in the negative direction towards node A of the chain.

Figure 5:
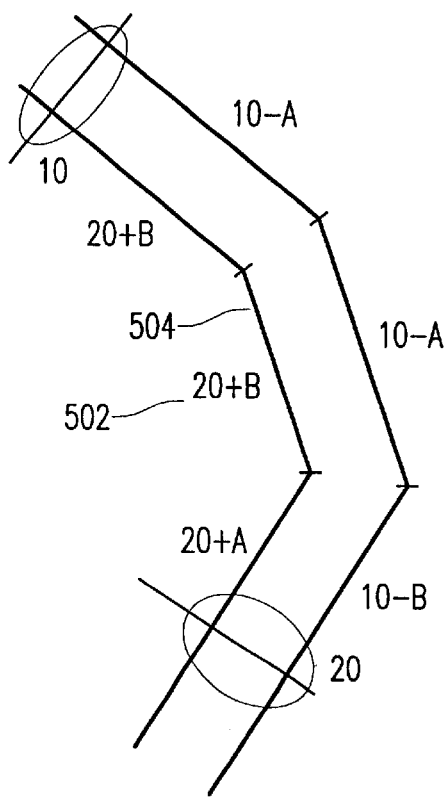
FIG. 5 shows an example of additional chain information for 1-directional chains.

FIG. 5 shows an example of additional chain information for 1-directional chains. Now there are different chains for the different directions of travelling, e.g. the different lanes on a highway, and each chain has one additional information item, e.g. item 502 of chain 504.

Figure 6:
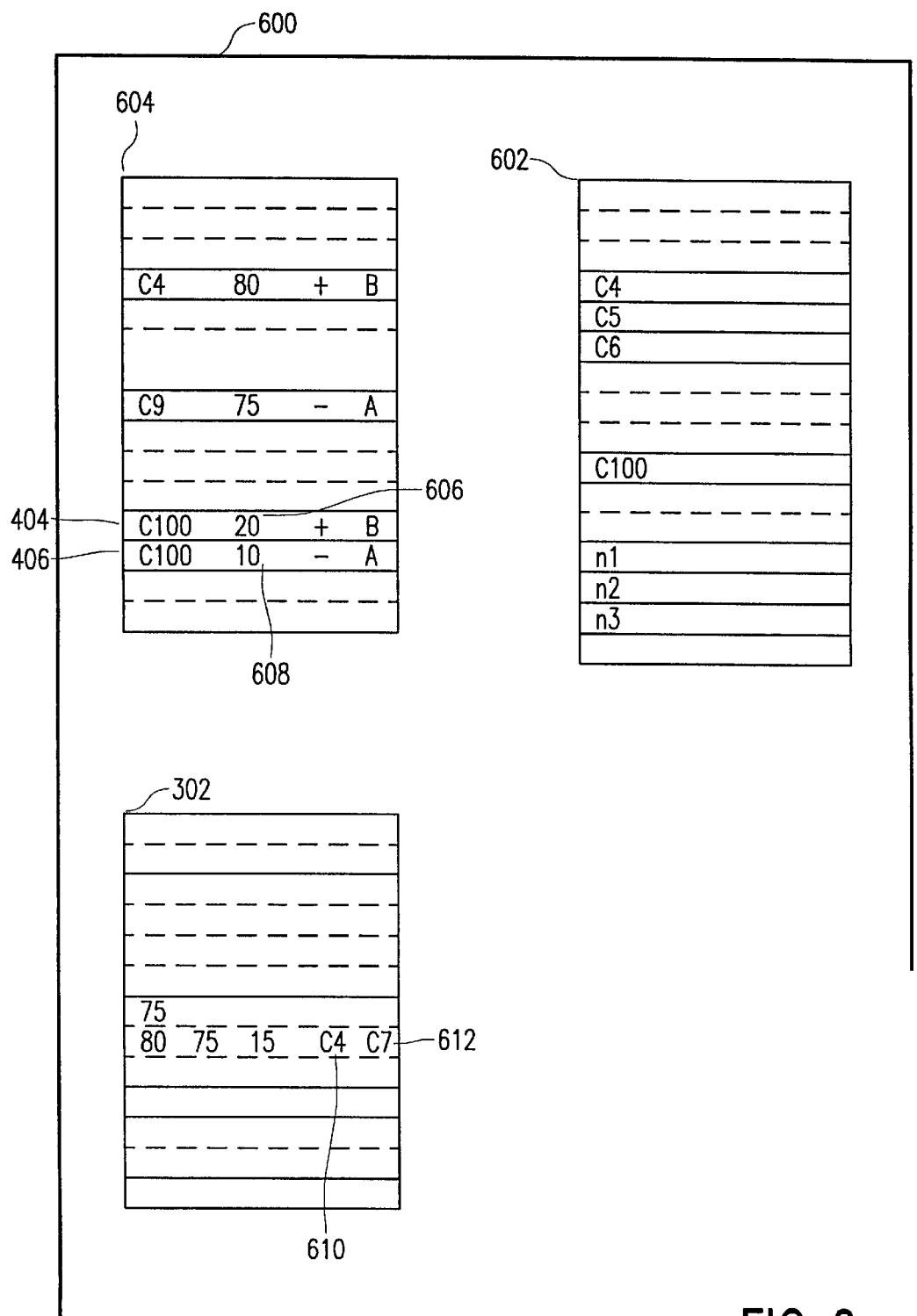
FIG. 6 shows the organisation of the information on the storage medium.

FIG. 6 shows the organisation of the information on the storage medium. The storage medium 600 has a first storage unit 602 comprising information on the chains and nodes. In a preferred embodiment, the first storage unit 602 is divided into blocks each corresponding to a rectangular area of the map. A block in that embodiment has a maximum size of 16 Kbytes and the size of the covered rectangular area depends on the amount of road information in that area. The storage medium has a second storage unit 604 comprising the additional chain information. If a chain has such additional chain information there is an entry for that chain in the second storage unit. The additional chain information includes the identification of a problem location to which the chain leads. For example chain 402, (FIG. 4) with identification c100, has additional chain information 404 including the first identification 606 of the related problem location. For a 2-directional chain like chain 402, there is a second additional information item 406 including a second identification 608 of the problem location to which the chain leads when travelled in the other direction. By storing the identifications of the problem locations in the second storage unit 604, the structure of the first storage unit 602 remains unchanged, despite the addition of the identifications. An advantage is that the basic map information remains the same and that no new division into rectangular areas is required, which could be necessary if the identifications of the problem location would be stored directly with the chains in the first storage unit. A further advantage is that a later version of the storage medium including the identifications of problem locations is compatible with the previous version of the storage medium without the identifications, as far as the first storage unit with the chains and nodes is concerned. This means that a previous version of the navigation system, i.e. a version which is not designed to read the identification of the problem location, is still able to read the later version of the storage medium.

The storage medium may further comprise a storage unit like table 302, that provides the identification of the chains connected to given problem location. For the problem location 204, (FIG. 2) with problem location number 80, there is stored a first identification 610 which identifies the chain connected to the problem location and leading away from it in the positive direction. Also for the problem location 204 a second identification 612 is store, this one identifying a chain connected to the problem location and leading away from it in the negative direction. This storage unit is also separate from the first storage unit, so as to not change the structure of the first unit.

The second storage unit 604 and the table 302 both provide a mechanism for integrating the information received in a traffic message with the information available in the datable of the navigation system. These mechanisms function independently from each other and one may be the storage medium without requiring the presence of the other.

What is claimed is:

1. A navigation system for guiding a driver in a vehicle, the system comprising:
    read means for reading chain information from a storage medium comprising a first storage unit for storage of information on chains and nodes, a chain representing a road element and being connected to another chain via a node,
    processing means for exploiting said chain information comprising at least one of a planning module for planning a route or of a display module for displaying a map on a display, and
    a broadcast receiver for the reception of a coded traffic message corresponding to a standardized event related to a predetermined problem location wherein
        the storage medium stores chains which lead to the predetermined problem locations;
        the read means are arranged to read from the storage medium for a particular chain related to a particular node the additional chain information linking the chain to the traffic message;

wherein the planning module selects the particular chains which fall within a predetermined search area; and wherein the system is arranged to create a list of the problem locations related to the particular chains in the search area.

2. A navigation system as claimed in claim 1, the system being arranged to create a sub-list containing the identifications of the problem locations related to the particular chains present in the planned route.

3. A navigation system as claimed in claim 1, wherein the read means are arranged to read the additional chain infofmation from a second storage unit of the storage medium.

4. A navigation system for guiding a driver in a vehicle, the system comprising:

read means for reading chain information from a storage medium comprising a storage unit for storage of information on chains and nodes, a chain representing a road element and being connected to another chain via node, processing means for exploiting said chain information, comprising at least one of a planning module for planning a route or of a display module for displaying a map on a display, wherein the planning module selects a predetermined area relating to the route and chains which are in the predetermined area and a broadcast receiver for the reception of a coded traffic message corresponding to a standardized event related to a problem location, and the storage unit stores the chains which lead to the problem location, wherein the read means read from the storage medium information comprising a first identification of a first one of the chains connected to the problem location by a corresponding node and wherein the system is arranged to create a list of the problem locations related to the particular chains in the search area.

5. A navigation system comprising:

read means for reading chain information from a storage medium comprising a first storage unit for storage of information on chains and nodes, a chain representing a road element and being connected to another chain via node, process means for exploiting said chain information, comprising at least one of a planning module for planning a route or of a display module for displaying a map on a display, and a receiver for the reception of a traffic message related to a problem location, wherein the read means are arranged to read from the storage medium for a problem location related to the traffic message information comprising a first identification of a first one of the chains connected to the problem location by a corresponding node wherein the read means are arranged to read from the storage medium for a problem location related to the traffic message information comprising a second identification of a second one of the chains connected to the problem location by a corresponding node, the second one of the chains extending in a direction opposite to the first one.

6. The navigation system in claim 5 further comprising; a planning module for planning a route between an origin and a designation which is arranged to take into account the particular chains that fall within a particular search area, the system being arranged to create a list containing the identifications of the problem locations related to the particular chains present in the search area.

7. The navigation system in claim 6 wherein the system creates a sub-list containing the identifications of the problem locations related to the particular chains present in the planned route.

8. The navigation system in claim 5 wherein the read means are arranged to read the additional chain information from a second storage unit of the storage medium.

9. A storage medium for use in a navigation system, the storage medium comprising a storage unit for storage of information on chains and nodes, a chain representing a road element and being connected to another chain via a node, wherein the storage medium further comprises storage for a particular chain of information on a first identification of a received first problem location, the problem corresponding to a standardized event, which first problem location corresponds to a particular node related to the particular chain; and wherein the storage medium stores the chains which lead to predetermined potential problem locations.

10. A storage medium as claimed in claim 9, the storage medium comprising a second storage unit comprising storage of information on the first identification.

11. A storage medium comprising a storage unit for storage of information on chains and nodes, a chain representing a road element and being connected to another chain via a node, wherein the storage medium further comprises storage for a particular chain of information on a first identification of a first problem location, which first problem location corresponds to a particular node related to the particular chain, and storage for the particular chain of information on a second identification of a second problem location, which second problem location corresponds to a particular node related to the particular chain and pertains to the opposite direction of travel compared with the first problem location.

12. A storage medium for use in a navigation system, the storage medium comprising a storage unit for storage of information on chains and nodes, a chain representing a road element and being connected to another chain via a node, wherein the storage medium comprises storage for a received particular pre-defined problem location of information, the problem corresponding to a standardized event, on an identification of one of the chains, which chain is connected to the pre-defined problem location by a corresponding node; and wherein the storage medium stores the chains which lead to the predetermined potential problem locations.

13. A storage medium comprising a first storage unit for storage of information on chains and nodes, a chain representing a road element and being connected to another chain via a node, wherein the storage medium comprises storage for a particular pre-defined problem location of information on a first identification of a first one of the chains, which chain is connected to the pre-defined problem location by a corresponding node, and storage for the particular problem location of information on a second identification of a second one of the chains, which second one of the chains is connected to the problem location by a corresponding node and which second one of the chains pertains to a direction of travel opposite to the first one.

\* \* \* \* \*